(12) United States Patent
Ceylan et al.

(10) Patent No.: US 12,358,466 B2
(45) Date of Patent: Jul. 15, 2025

(54) METHOD AND DEVICE FOR USING A VALET PARKING SERVICE

(71) Applicant: Bayerische Motoren Werke Aktiengesellschaft, Munich (DE)

(72) Inventors: Adem Ceylan, Munich (DE); Alaa Mourad, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/543,407

(22) Filed: Dec. 18, 2023

(65) Prior Publication Data
US 2024/0198961 A1 Jun. 20, 2024

(30) Foreign Application Priority Data

Dec. 19, 2022 (DE) ..................... 10 2022 133 955.6

(51) Int. Cl.
| | | |
|---|---|---|
| *B60R 25/24* | (2013.01) | |
| *B60R 25/01* | (2013.01) | |
| *B60W 30/06* | (2006.01) | |
| *B60W 50/14* | (2020.01) | |

(52) U.S. Cl.
CPC ............ *B60R 25/241* (2013.01); *B60R 25/01* (2013.01); *B60W 30/06* (2013.01); *B60W 50/14* (2013.01); *B60R 2325/205* (2013.01); *B60W 2050/146* (2013.01); *B60W 2556/40* (2020.02); *B60W 2556/45* (2020.02)

(58) Field of Classification Search
CPC . B60R 25/241; B60R 25/01; B60R 2325/205; B60W 30/06; B60W 50/14; B60W 2050/146; B60W 2556/40; B60W 2556/45
See application file for complete search history.

(56) References Cited

U.S. PATENT DOCUMENTS

| | | | |
|---|---|---|---|
| 2015/0123818 A1 | 5/2015 | Sellschopp | |
| 2016/0063863 A1 | 3/2016 | Stefik et al. | |
| 2016/0203650 A1* | 7/2016 | Stanford | G07B 15/02 |
| | | | 705/13 |
| 2017/0320466 A1 | 11/2017 | Nordbruch | |
| 2017/0329346 A1 | 11/2017 | Latotzki | |
| 2019/0188817 A1 | 6/2019 | Yanagida et al. | |
| 2020/0406887 A1* | 12/2020 | Khurewattanakul | G08G 1/143 |
| 2021/0158410 A1 | 5/2021 | Rosas-Maxemin et al. | |
| 2022/0011125 A1* | 1/2022 | Ge | G08G 1/096883 |
| 2022/0139137 A1* | 5/2022 | Johnson | G07C 9/00857 |
| | | | 340/5.25 |

FOREIGN PATENT DOCUMENTS

| | | | |
|---|---|---|---|
| DE | 10 2014 224 080 A1 | 6/2016 | |
| DE | 10 2015 200 492 A1 | 7/2016 | |

OTHER PUBLICATIONS

German-language Search Report issued in German Application No. 10 2022 133 955.6 dated Mar. 11, 2025 with partial English translation (12 pages).

\* cited by examiner

*Primary Examiner* — Omeed Alizada
(74) *Attorney, Agent, or Firm* — Crowell & Moring LLP

(57) ABSTRACT

A navigation device for a motor vehicle is configured to determine that a valet parking service is available at a destination of a route of the motor vehicle. The device is further configured, in response to the determination, to bring about sending of a digital key for an access system of the motor vehicle to the valet parking service, in particular to a mobile electronic device of the valet parking service.

13 Claims, 2 Drawing Sheets

METHOD AND DEVICE FOR USING A VALET PARKING SERVICE

CROSS REFERENCE TO RELATED APPLICATION

This application claims priority under 35 U.S.C. § 119 from German Patent Application No. 102022133955.6, filed Dec. 19, 2022, the entire disclosure of which is herein expressly incorporated by reference.

BACKGROUND AND SUMMARY

The invention relates to a method and to a corresponding device that are aimed at enabling particularly convenient use of a valet parking service, that is to a say parking service.

A valet parking service is often offered at certain destinations, such as for example at restaurants, at hotels and/or at event venues, allowing the user of a vehicle to hand over the vehicle to a service employee of the valet parking service at a drop-off point. The service employee takes the vehicle key and parks the vehicle in a parking lot.

A vehicle may be equipped with a digital access system that allows the user to use an electronic device, such as for example a smartphone, with a digital key as the vehicle key. The use of a valet parking service in the case of a vehicle having a digital access system is usually inconvenient, since the vehicle key cannot be easily transferred to the service employee at the drop-off point.

The present document is concerned with the technical object of improving the convenience of a valet parking service in the case of a vehicle having a digital access system.

The object is achieved by each of the independent claims. Advantageous embodiments are described inter alia in the dependent claims. It is pointed out that additional features of a patent claim dependent on an independent patent claim, without the features of the independent patent claim or in combination only with a subset of the features of the independent patent claim, may form a standalone invention that is independent of the combination of all of the features of the independent patent claim and may be made into the subject matter of an independent claim, a divisional application or a subsequent application. This applies in the same way to technical teachings that are described in the description and may form an invention independent of the features of the independent patent claims.

According to one aspect, what is described is a navigation device for a motor vehicle. The navigation device may be integrated in the motor vehicle. As an alternative, the navigation device may be operated in conjunction with the motor vehicle, for instance on a mobile user device (for example to plan a route of the vehicle to a destination).

The navigation device is configured to determine that a valet parking service is available at a destination of a route of the motor vehicle. The destination may for example have been entered by a user via a user interface (of the navigation device).

The navigation device may be configured to communicate with a computing unit (for example with an (Internet) server) over a long-range communication connection (for example 3G, 4G or 5G). The communication may take place for example as part of the planning of the route to the destination. A database of the computing unit may be used to check and/or ascertain whether a valet parking service is available at the destination. A data address (for example an Internet address, an email address or a telephone number) of the valet parking service may potentially also be ascertained here.

The navigation device may be configured to ascertain the route to the destination based on a digital map of the road network traveled on by the motor vehicle. The digital map may be stored on a storage unit of the navigation device and/or on the computing unit (for instance on the server). As an alternative or in addition, the navigation device may be configured to determine, based on the digital map, that a valet parking service is available at the destination. By way of example, it is possible to display, in the digital map as a map attribute for the destination, whether a valet parking service is available at the destination. The data address of the valet parking service may also be indicated.

The navigation device may have a user interface that allows the user to enter a destination. A route to the destination may then be ascertained based on the destination and using the digital map. As an alternative or in addition, it may be ascertained whether or not a valet parking service is available at the destination.

The navigation device is furthermore configured, in response to the determination, to bring about sending of a digital key for the (digital) access system of the motor vehicle to the valet parking service, in particular to a (mobile) electronic device of the valet parking service. The digital key may be designed in accordance with a Car Connectivity Consortium (CCC) key standard (for example CCC Release 3). As an alternative or in addition, the digital key may be designed to enable the electronic device (for example a smartphone) of the valet parking service to control one or more vehicle functions of the motor vehicle. Examples of vehicle functions are the opening and/or closing of a vehicle door and/or the starting and/or stopping of the drive motor of the vehicle.

The navigation device may for example be configured to send a key message containing the digital key to the data address of the valet parking service over a long-range communication connection (for example 3G, 4G or 5G).

What is thus described is a navigation device that allows a vehicle user (for example as part of the planning of a route to a destination) to prepare, in a convenient manner, to use a valet parking service at the destination. This may be done before the destination is reached (for example at the beginning of the journey to the destination). The early transfer of the digital key to the valet parking service allows the user to hand over the motor vehicle to a service employee of the valet parking service in a convenient manner at the destination. The service employee may then use the electronic device with the received digital key for the access system of the vehicle in order to control one or more vehicle functions of the vehicle.

The navigation device may be configured to derive the digital key that is sent to the valet parking service from a master key of the access system. The master key may for example be stored in a storage unit of the vehicle and/or in a storage unit of a user device of the user of the vehicle. The digital key is thus able to be generated in a particularly reliable and secure manner.

The navigation device may be configured to issue a request to the user of the motor vehicle via the user interface as to whether or not the digital key should be transferred and/or sent to the valet parking service. Depending on a (subsequent) user input on the user interface, it is then possible to bring about sending of the digital key to the valet parking service. The user may thus be given the ability to explicitly authorize the transmission of the digital key. User convenience is thus able to be further increased.

The navigation device may be configured to ascertain one or more restrictions on the digital key. The one or more restrictions may be ascertained in particular based on a user input on the user interface. Examples of restrictions are:
- a restriction in relation to the period of time for which the digital key is able to be used by the access system; and/or
- a restriction in relation to the one or more vehicle functions of the motor vehicle that are able to be controlled by the digital key.

It is possible to bring about sending of a digital key that has the one or more ascertained restrictions to the valet parking service. The user may thus be given the ability to limit the scope of use of the access system of the vehicle in a flexible and convenient manner.

The navigation device may be configured to determine, in particular based on a user input on the user interface, that the valet parking service should no longer be used (for example because the destination has changed). It is then possible to bring about revocation and/or cancellation of the digital key sent to the valet parking service. This allows the user to control the use of the digital key in a particularly reliable and convenient manner.

According to a further aspect, what is described is a (mobile and/or electronic) user device (for example a smartphone or generally a smart device) for a user of a motor vehicle. The user device may have a digital key for an access system of the motor vehicle (wherein the digital key is stored for example in a secure memory of the user device). The user device may be designed to control one or more vehicle functions of the motor vehicle based on the digital key. Furthermore, the user device comprises a navigation device as described in this document (which is designed for example as a software application). The navigation device may be integrated into a navigation application of the user device.

According to a further aspect, what is described is a (road-bound) motor vehicle (in particular a passenger car or a truck or a bus or a motorcycle) that comprises the navigation device described in this document (for example as part of the navigation system of the vehicle). The vehicle may furthermore comprise an access system that allows a user to control one or more vehicle functions (in particular the opening and closing of a vehicle door and/or the starting of the drive motor) of the motor vehicle based on a (mobile electronic) device with a digital key.

According to a further aspect, what is described is a method for using (in particular for preparing to use) a valet parking service for a motor vehicle. The method comprises determining that a valet parking service is available at a destination of a route of the motor vehicle. This may be detected by a navigation device and/or by a navigation application. The method furthermore comprises, in response to the determination, bringing about sending of a digital key for the access system of the motor vehicle to the valet parking service, in particular to a mobile electronic device of the valet parking service.

According to a further aspect, what is described is a software (SW) program. The SW program may be configured to be executed on a processor (for example on a controller of a vehicle) in order thereby to carry out the method described in this document.

According to a further aspect, what is described is a storage medium. The storage medium may comprise an SW program that is configured to be executed on a processor and thereby to carry out the method described in this document.

It should be noted that the methods, devices and systems described in this document may be used both on their own and in combination with other methods, devices and systems described in this document. Furthermore, any aspects of the methods, devices and systems described in this document may be combined with one another in a wide variety of ways. The features of the claims may in particular be combined with one another in a wide variety of ways. Furthermore, features in parentheses are to be understood as optional features.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
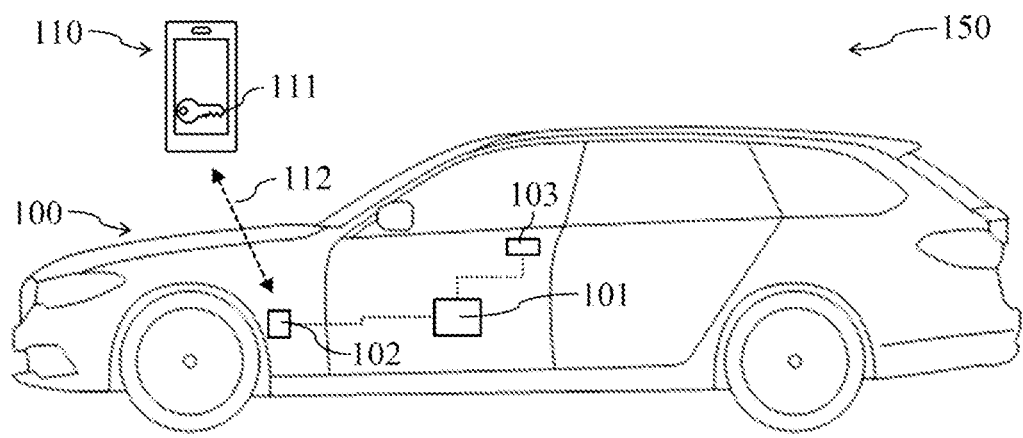
FIG. 1a shows an exemplary digital access system of a vehicle.

As explained at the outset, the present document is concerned with improving the convenience of a valet parking service in connection with a vehicle that has a digital access system. FIG. 1a shows an exemplary (access) system 150 that comprises a vehicle 100 and at least one digital key device 110. The digital key device 110 is typically a portable electronic device, such as for example a smartphone or a tablet PC, wherein a digital key 111 is stored on the portable electronic device. The digital key 111 may be stored in a protected memory area, in particular in what is known as a "secure element", of the portable electronic device.

The digital key device 110 is designed to communicate with a communication unit 102 of the vehicle 100 over one or more different wireless communication connections 112. The different communication connections 112 may be used for different purposes. In particular, a Bluetooth Low Energy (BLE) communication connection 112 may be used to:
- determine the distance and/or the relative position between the digital key device 110 and the vehicle 100 (in particular on the basis of the signal strength, in particular the RSSI (Received Signal Strength Indicator), of the radio signals interchanged between the vehicle 100 and the device 110); and/or
- interchange data between the digital key device 110 and the vehicle 100 (for example a control command for controlling a vehicle function 103, such as the unlocking of a door and/or the opening or closing of a window and/or the activation or deactivation of a heating function and/or the activation or deactivation of the drive motor of the vehicle 100).

As an alternative or in addition, an ultra-wideband (UWB) communication connection 112 may be used to determine the position of the device 110 relative to the vehicle 100 with a relatively high degree of accuracy.

Determining the position of the device 110 using the UWB communication connection 112 may be referred to as UWB ranging.

Figure 1B:
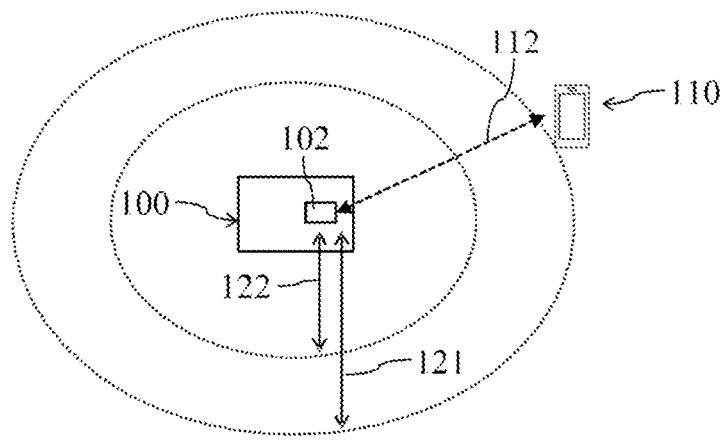
FIG. 1b shows an exemplary usage situation for a digital access system.

A (control) device 101 of the vehicle 100 may be designed to control at least one vehicle function 103 of the vehicle 100 on the basis of the communication between the device 110 and the vehicle 100, as illustrated by way of example in FIG. 1b. In this context, the digital key 111 of the device 110 may be verified, in particular authenticated. Furthermore, after successful authentication, one or more vehicle functions 103 may be controlled, in particular on the basis of:

the distance between the device 110 and the vehicle 100;
the position of the device 110 relative to the vehicle 100; and/or
a control command that is sent from the device 110 to the vehicle 100 over a communication connection 112.

In an exemplary system 150, a BLE communication connection 112 may be established between the device 110 and the vehicle 100 as soon as the distance between the device 110 and the vehicle 100 is equal to or less than a first distance threshold value 121. This allows the user to remotely control one or more vehicle functions 103 using the device 110. Typically, the vehicle 100 indicates the availability of a BLE communication connection 112 repeatedly, for example at a certain frequency. From the first distance threshold value 121, the device 110 (which may also be referred to as "user equipment" (UE)) receives the indication message from the vehicle 100 and the BLE communication connection 112 may then be established between the device 110 and the vehicle 100. The first distance threshold value 121 may depend on the communication capabilities of the device 110, the environment of the vehicle 100 and/or of the device 110, and/or the position of the device 110 relative to the vehicle 100.

Furthermore, a UWB communication connection 112 may be established between the device 110 and the vehicle 100 as soon as the distance between the device 110 and the vehicle 100 is equal to or less than a second distance threshold value 122 (which may be less than the first distance threshold value 121 and/or which may depend on the communication capabilities of the device 110). Based on the UWB communication connection 112, the location of the device 110 may be determined with a relatively high degree of accuracy. One or more further vehicle functions 103 may possibly be controlled over the UWB communication connection 112 (in addition to the one or more functions 103 that are able to be controlled over the BLE communication connection 112).

As part of using a valet parking service, the user of the vehicle 100 typically hands over the (mechanical) key of the vehicle 100 to a service employee at a drop-off point. In the case of using a digital access system 150, the digital key 111 (or a key derived therefrom) would have to be transferred to the electronic device 110 of the service employee or shared with the electronic device 110 of the service employee at the drop-off point, which may however be relatively time-consuming and inconvenient.

Figure 2:
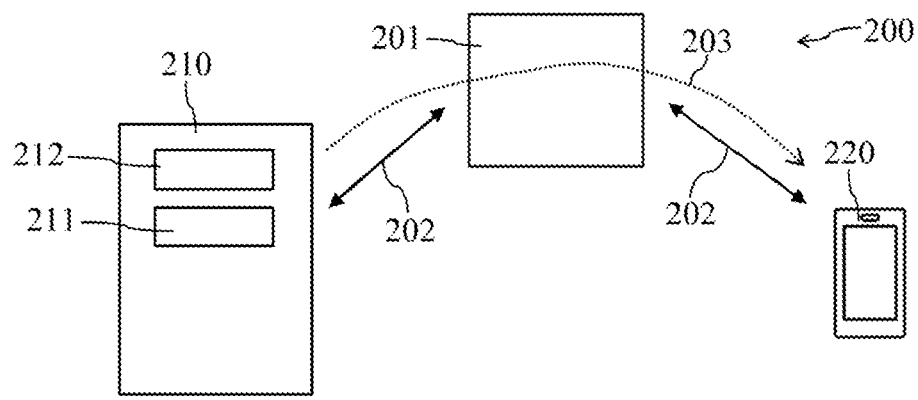
FIG. 2 shows an exemplary system for providing and/or assisting a valet parking service.

FIG. 2 shows an exemplary system 200 for assisting and/or providing a valet parking service. The system 200 comprises a navigation device 210, which is for example part of the vehicle 100 and/or part of a user device 110 of the user of the vehicle 100. The navigation device 210 may be designed to communicate with a computing unit 201 (for example with a backend server) over a long-range communication connection 202, for example over a 3G, 4G or 5G connection.

The navigation device 210 may be designed to allow the user to define a destination 212 for a route (for example as part of the planning of the route, at the beginning of a journey). The navigation device 210 may furthermore check whether a valet parking service is available at the destination 212. This may be ascertained for example based on a database stored on the computing unit 201. If it is detected that a valet parking service is available at the destination 212, a digital key 211 for the digital access system 150 of the vehicle 100 may be transferred to the valet parking service, possibly automatically or after authorization by the user. The digital key 211 may be derived from the digital key 111 of the user. To transfer the key 211, a key message 203 containing the digital key 211 may be sent to the computing unit 201 and, from there, to an electronic device 220 of a service employee of the valet parking service. The device 220 thereby becomes a digital key device 110 of the access system 150 of the vehicle 100.

The digital key 211 that is transferred to the device 220 of the valet parking service may have one or more restrictions, such as for example:

a time restriction; and/or
a restriction in relation to the one or more vehicle functions 103 that are able to be controlled by the key 211.

The navigation device 210 may have a user interface that allows the user to:

define the destination 212; and/or
confirm that the digital key 211 should be transferred to the valet parking service at the destination 212.

When entering an address of a hotel, a restaurant, etc. as destination 212, the user may thus be asked, via the user interface of the navigation device 210 (provided that the user has a digital key 111), whether they would like to share their digital key 111 with the valet parking service at the destination 212. If the user confirms their intention to share, a key 211 derived from the digital key 111 is shared automatically (for example for a certain period of time) with the valet parking service. In this case, the shared digital key 211 may enable one or more rights linked to the key 211 to be revoked and/or one or more functions 103 of the vehicle 100 to be restricted.

Figure 3:
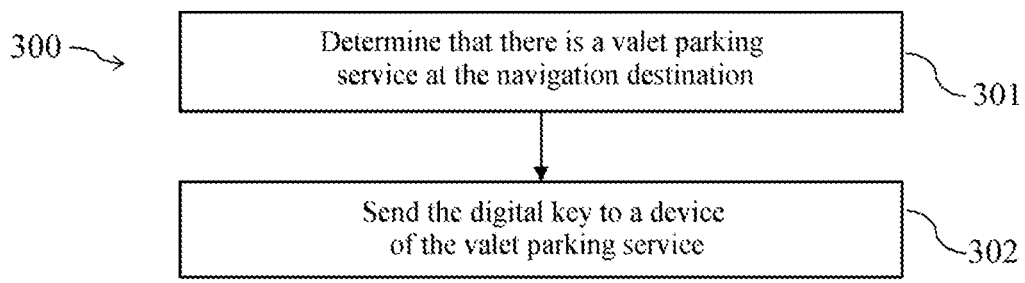
FIG. 3 is a flowchart of an exemplary method for providing and/or assisting a valet parking service.

FIG. 3 is a flowchart of an exemplary (possibly computer-implemented) method 300 for using and/or assisting and/or providing a valet parking service for a motor vehicle 100. The method 300 may be carried out by a (control) device 101 of the vehicle 100 and/or by a mobile electronic user device 110, for example by a smartphone.

The method 300 comprises determining 301 that a valet parking service is available at a destination 212 of a route of the motor vehicle 100. The destination 212 may for example be a specific point of interest (POI) in a digital map of the road network traveled on by the vehicle 100. The digital map may indicate that a valet parking service is available at the destination 212. A data address, to which a key message 203 containing a digital key 211 for the valet parking service may be sent, may also possibly be indicated.

The method 300 furthermore comprises, in response to the determination 301, bringing about 302 sending of a digital key 211 for the access system 150 of the motor vehicle 100 to the valet parking service, in particular to a (possibly mobile) electronic device 220 of the valet parking service. By way of example, a key message 203 containing the digital key 211 may be sent to the data address (indicated in the digital map) of the valet parking service. The key message 203 may be sent over a long-range communication connection 202.

The aspects described in this document make it possible to improve the convenience of using a valet parking service in an efficient and reliable manner in the case of a vehicle having a digital access system 150.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for a motor vehicle, comprising:
   a navigation device of the motor vehicle, the navigation device being operatively configured to:
   determine that a valet parking service is available at a destination of a route of the motor vehicle;
   in response to the determination, cause a sending of a digital key for an access system of the motor vehicle to the valet parking service;
   ascertain one or more restrictions on the digital key, wherein the one or more restrictions include:
      a restriction in relation to a period of time for which the digital key is able to be used by the access system; or
      a restriction in relation to one or more vehicle functions of the motor vehicle that are able to be controlled by the digital key; and
   cause the sending of a digital key that has the one or more restrictions to the valet parking service;
   wherein the one or more vehicle functions are controlled based on at least one of a distance between the device and the motor vehicle and a position of the device relative to the motor vehicle, and based on a control command that is sent from the device to the motor vehicle over a communication connection.

2. The device according to claim 1, wherein the digital key is for a mobile electronic device of the valet parking service.

3. The device according to claim 1, wherein the navigation device is further configured to:
   issue a request to a user of the motor vehicle via a user interface as to whether or not the digital key should be transferred to the valet parking service; and
   depending on a user input on the user interface, cause the sending of the digital key to the valet parking service.

4. The device according to claim 1, wherein the navigation device is further configured to:
   communicate with a computing unit over the communication connection which is a long-range communication connection; and
   use a database of the computing unit to check whether the valet parking service is available at the destination.

5. The device according to claim 1, wherein the navigation device is further configured to ascertain the one or more restrictions based on a user input on a user interface.

6. The device according to claim 1, wherein the navigation device is further configured to:
   determine, based on a user input on a user interface, that the valet parking service should no longer be used; and
   in response to the determination, cause a revocation and/or a cancellation of the digital key sent to the valet parking service.

7. The device according to claim 1, wherein the navigation device is further configured to derive the digital key that is sent to the valet parking service from a master key of the access system.

8. The device according to claim 1, wherein
   the digital key is designed in accordance with a Car Connectivity Consortium (CCC) key standard; and/or
   the digital key is designed to enable an electronic device of the valet parking service to control one or more vehicle functions of the motor vehicle.

9. The device according to claim 1, wherein the navigation device is further configured to:
   ascertain a route to the destination based on a digital map of a road network traveled on by the motor vehicle; and/or
   determine, based on the digital map, that the valet parking service is available at the destination.

10. A device for a user of a motor vehicle, comprising:
    a user device having a digital key for an access system of the motor vehicle, wherein
    the user device is configured to control one or more vehicle functions of the motor vehicle based on the digital key;
    a navigation device operatively configured to:
    determine that a valet parking service is available at a destination of a route of the motor vehicle;
    in response to the determination, cause a sending of the digital key for the access system of the motor vehicle to the valet parking service;
    ascertain one or more restrictions on the digital key, wherein the one or more restrictions include:
       a restriction in relation to a period of time for which the digital key is able to be used by the access system; or
       a restriction in relation to one or more vehicle functions of the motor vehicle that are able to be controlled by the digital key; and
    cause the sending of a digital key that has the one or more restrictions to the valet parking service;
    wherein the one or more vehicle functions are controlled based on at least one of a distance between the device and the motor vehicle and a position of the device relative to the motor vehicle, and based on a control command that is sent from the device to the motor vehicle over a communication connection.

11. A motor vehicle, comprising:
    an access system that allows a user to control one or more vehicle functions of the motor vehicle based on a device with a digital key; and
    a navigation device of the motor vehicle, the navigation device being operatively configured to:
    determine that a valet parking service is available at a destination of a route of the motor vehicle;
    in response to the determination, cause a sending of the digital key for the access system of the motor vehicle to the valet parking service;
    ascertain one or more restrictions on the digital key, wherein the one or more restrictions include:
       a restriction in relation to a period of time for which the digital key is able to be used by the access system; or
       a restriction in relation to one or more vehicle functions of the motor vehicle that are able to be controlled by the digital key; and
    cause the sending of a digital key that has the one or more restrictions to the valet parking service;
    wherein the one or more vehicle functions are controlled based on at least one of a distance between the device and the motor vehicle and a position of the device relative to the motor vehicle, and based on a control command that is sent from the device to the motor vehicle over a communication connection.

12. A method for using a valet parking service for a motor vehicle, the method comprising:

determining that a valet parking service is available at a destination of a route of the motor vehicle;

in response to the determination, causing a sending of a digital key for an access system of the motor vehicle to the valet parking service;

ascertain one or more restrictions on the digital key, wherein the one or more restrictions include:

a restriction in relation to a period of time for which the digital key is able to be used by the access system; or a restriction in relation to one or more vehicle functions of the motor vehicle that are able to be controlled by the digital key; and cause the sending of a digital key that has the one or more restrictions to the valet parking service;

wherein the one or more vehicle functions are controlled based on at least one of a distance between the device and the motor vehicle and a position of the device relative to the motor vehicle, and based on a control command that is sent from the device to the motor vehicle over a communication connection.

13. The method according to claim 12, wherein the sending is to a mobile electronic device of the valet parking service.

* * * * *